United States Patent Office 3,453,163
Patented July 1, 1969

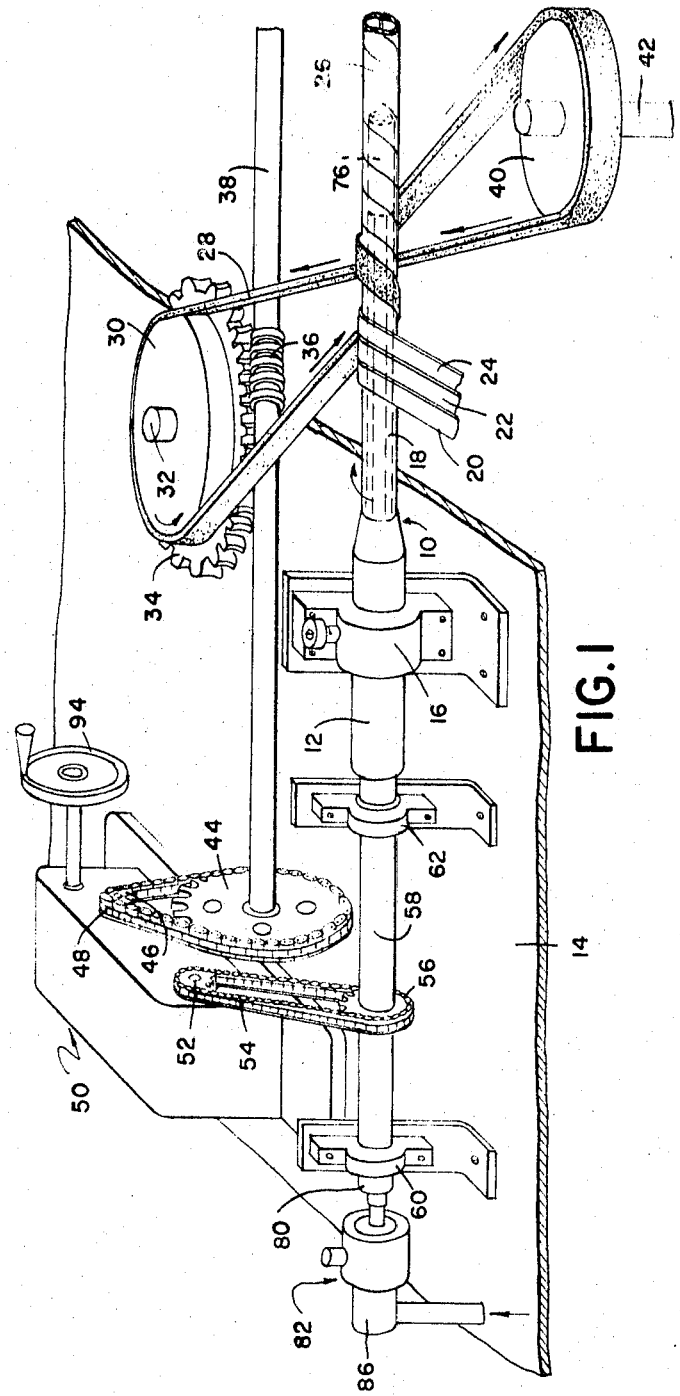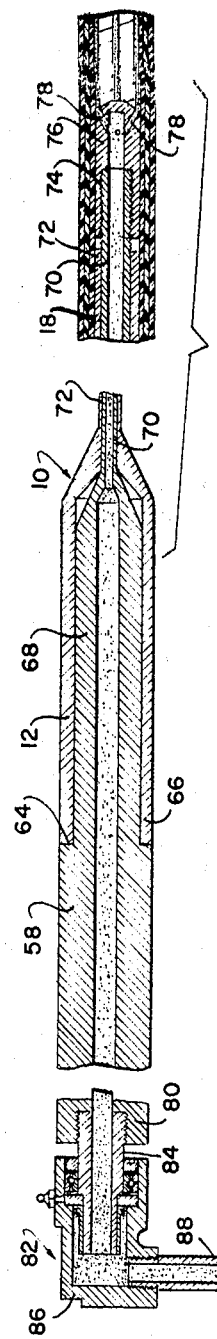
INVENTORS
SAMUEL MILLS &
KAREL HUSAR

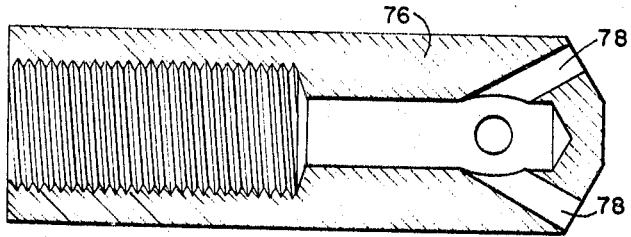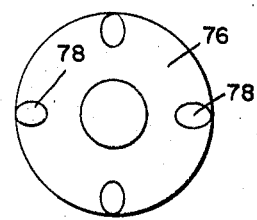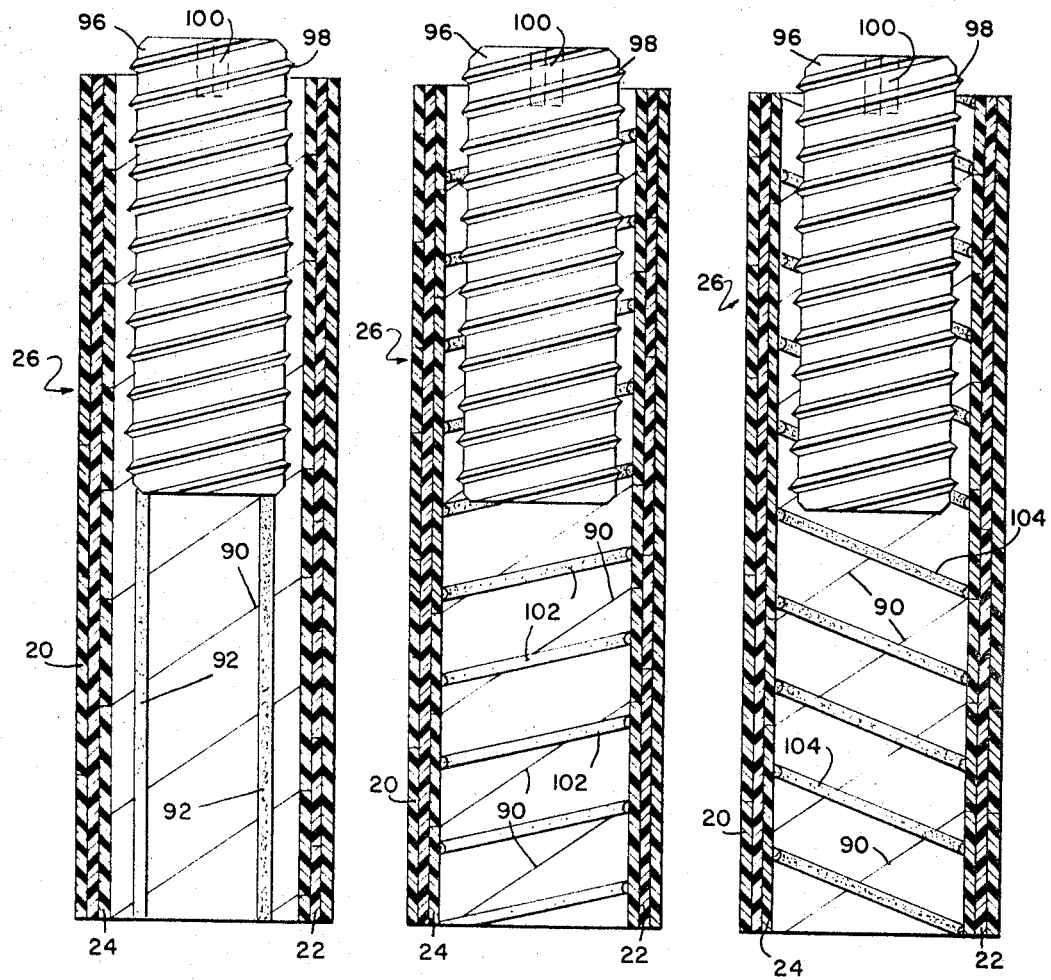

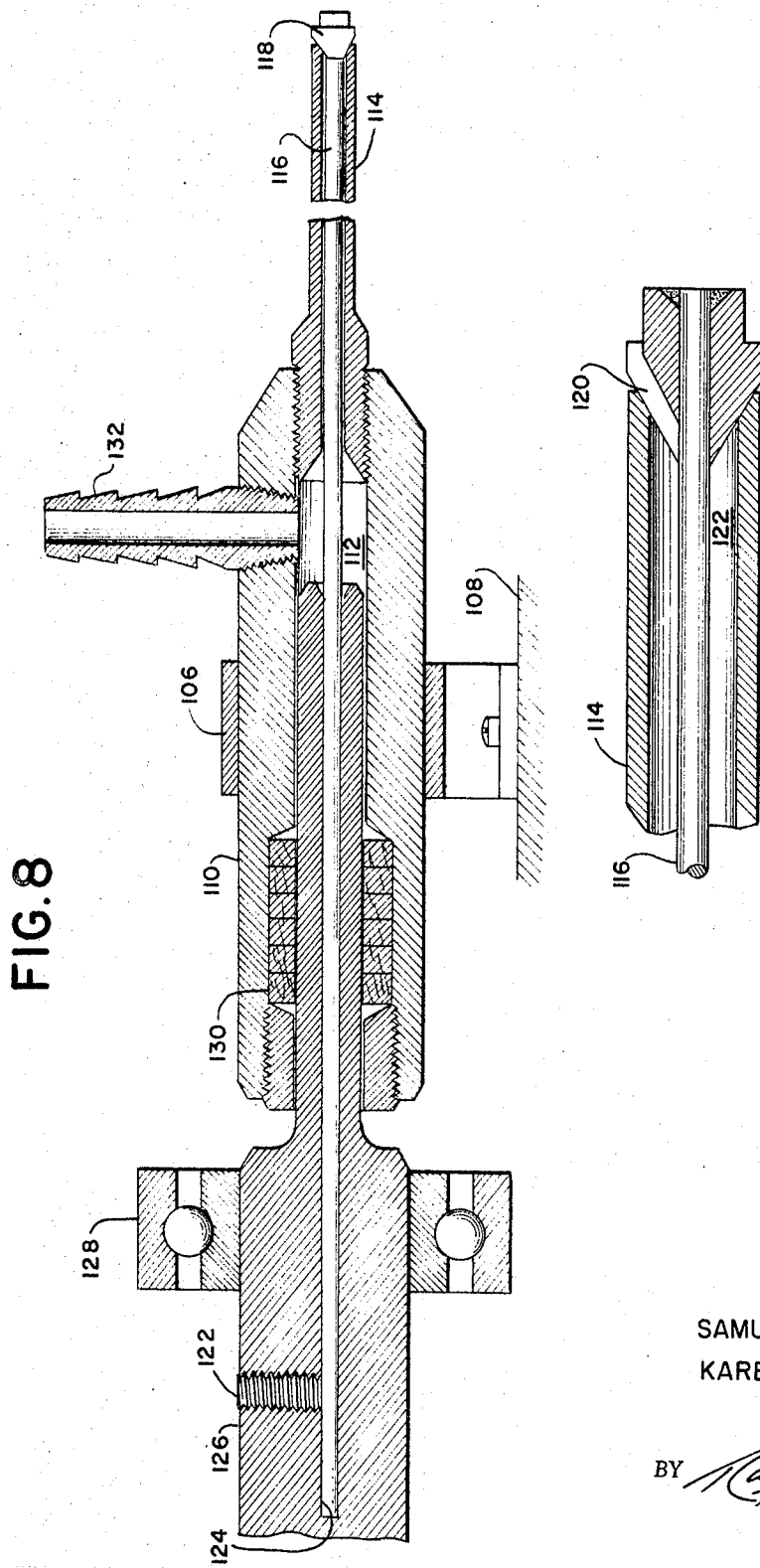

3,453,163
METHOD OF MAKING HELICALLY WOUND BODIES HAVING PLASTIC MATERIAL EXTRUDED ON THEIR INNER WALLS
Samuel M. Mills, University Park, and Karel Husar, College Park, Md., assignors to Stone Straw Corporation, a corporation of New Jersey
Continuation-in-part of application Ser. No. 345,835, Feb. 17, 1964, now Patent No. 3,347,274. This application Oct. 10, 1967, Ser. No. 674,315
The portion of the term of the patent subsequent to Feb. 6, 1985, has been disclaimed
Int. Cl. B32b 31/30; B29d 23/12
U.S. Cl. 156—190                                  9 Claims

ABSTRACT OF THE DISCLOSURE

The disclosure teaches a method of making an internally coated tube by forming the same and advancing it along a hollow mandrel and extruding through a nozzle rotating relative to the mandrel a plastic composition into adherent contact with the tube inner wall.

---

This is a continuation-in-part application based upon application Ser. No. 345,835, filed on Feb. 17, 1964, now Patent No. 3,347,274.

This invention relates to tubular bodies and to methods and apparatus for making the same. It relates particularly to helically wound tubular bodies having plastic material extruded on their inner walls. Such bodies have a variety of uses, outstanding among which is their use as coil forms for permeability tuned inductances adapted to receive adjustable magnetic cores or slugs and to maintain such cores or slugs in any adjusted position.

Prior to the present time, wherever beads or stripes of plastic material have been applied to the inner walls of helically wound tubes, such beads or stripes have been helical and of the same pitch as the tube itself. There has been a long existing need for helically wound tubes having beads or stripes on their inner walls having a pitch different from that of the tube itself. To achieve the optimum centering effect for an inserted magnetic core or slug, it is frequently desirable to provide such beads or stripes along the inner walls of such tubes extending parallel to the axes of the tubes. The present invention renders it possible, for the first time, to achieve such results and in addition renders it possible to form such plastic beads or stripes at any desired angle to the joints defined by adjacent convolutions of the tube itself.

In accordance with the present invention, the material applied to the inner walls of the tubes for engagement with the threads of such adjustable magnetic cores, can be varied it pitch, breadth, height, color, electrical properties and general configuration with a high degree of facility so as to satisfy the requirements of different users of the resulting coil forms with a minimum of inconvenience and at a reasonable cost.

Whereas the product, method and apparatus will be discussed in the present specification in connection with the production of such coil forms, it is contemplated that any other products involving similar problems be similarly produced with similar apparatus.

It is among the objects of the present invention to provide a tube comprising an inner wall defined by an adhesively bonded wound strip having a helical joint, and a stripe of plastic material adhesively attached to the wall and intersecting the joint. Such a tube will have an axis and the stripe can be substantially parallel to such axis. A plurality of such stripes will preferably be formed, substantially parallel to the tube axis. The stripe may be helically formed and of similar hand to the tube joint or of dissimilar hand and in either case, the joint and stripe helices may be of different pitch.

It is also among the objects of the present invention to provide a coil form comprising a helically wound annular tube of insulating material having an inner wall bearing a stripe of resilient, adhesive plastic material disposed substantially parallel to the longitudinal axis of the tube. The inner wall of such tube preferably bears a plurality of stripes of resilient, adhesive plastic material disposed substantially parallel to the longitudinal axis of the tube.

The present invention also contemplates a method of making an internally coated tube comprising helically winding a flexible strip on a hollow mandrel, adhesively bonding convolutions of the strip together to produce a self-supporting tube, advancing the tube along the mandrel, and extruding through a nozzle rotating relative to the mandrel a plastic composition under pressure through the mandrel into adherent contact with inner wall portions of the tube as the tube advances with respect to the mandrel. The mandrel is preferably fixed and the plastic composition is preferably extruded continuously while the tube advances with respect to the mandrel. A plurality of such bodies of plastic composition are preferably extruded into contact with the inner wall portions of the tube to form parallel beads thereon.

Also among the objects of the present invention is the provision of a method of making a coil form comprising helically winding a plurality of flexible insulating strips in superimposed relationship on a hollow mandrel, adhesively bonding convolutions of the strips together to produce a self-supporting tube, advancing the tube along the mandrel, and extruding through a nozzle rotating relative to the mandrel a resilient adhesive plastic composition in the form of a bead adhering to the inner wall of the tube as the tube advances with respect to the mandrel. The nozzle is preferably rotated in the same direction as the winding direction of the strips. However, the nozzle can be rotated in a direction opposite to the winding direction of the strips. The strip or strips may be composed of a polyester and the plastic composition may likewise be composed of a polyester. The tube may be subsequently impregnated with a polyester. The nozzle and tube are preferably rotated at equal rates relative to the mandrel in order to provide beads or stripes parallel to the tube axis.

The apparatus contemplated by the present invention comprises a fixed hollow mandrel having an outer surface, means for helically winding a strip of material on the surface to form a tube, a rotatable conduit extending through the mandrel having a discharge port beyond the mandrel for the extrusion of a plastic material on the inner wall of a tube formed on the mandrel, means for supplying plastic material to the tube, and driving means for the winding means and conduit. The driving means perferably includes means for controlling the relative speeds of the winding means and conduit by virtue of which the winding means and conduit can receive rotational speeds which are equal, opposite, or unequal in the same direction. The conduit carries a nozzle containing the port at a position beyond the mandrel, permitting a portion of the nozzle to serve as an extension of the mandrel. The nozzle can contain any desired number of discharge ports connected to a single source of supply of plastic material or to separate sources of supply where beads of different characteristics are desirable.

A more complete understanding of the invention will follow from a description of the accompanying drawings, wherein:

FIG. 1 is a somewhat diagrammatic representation in perspective depicting the manner in which three strips of material are wound upon a mandrel through which a rotatable conduit extends so that plastic material can be extruded upon the inner wall of the tube as it advances along the mandrel;

FIG. 2 is a sectional elevation, partially broken away, depicting the relationship of the mandrel, conduit and a rotary joint through which plastic is introduced to the conduit, together with a portion of a tube being formed and receiving extruded beads of the plastic material;

FIG. 3 is an end elevation on an enlarged scale depicting a nozzle containing four discharge ports;

FIG. 4 is a sectional elevation of the nozzle on an enlarged scale;

FIG. 5 is a sectional elevation on an enlarged scale of a coil form containing beads parallel to the axis of the tube into which a threaded magnetic core has been introduced;

FIG. 6 is a sectional elevation on an enlarged scale of a coil form containing beads of the same hand as the wound strips constituting the tube but of different pitch;

FIG. 7 is a sectional elevation on an enlarged scale of a tube containing beads of opposite hand to that of the strips from which the tube is formed;

FIG. 8 is a sectional elevation of a modified form of the invention; and

FIG. 9 is a detailed sectional view thereof, on an enlarged scale.

Referring to FIG. 1 of the drawings there is depicted a mandrel 10 having an enlarged portion 12 secured to a suitable frame 14 by a clamping bracket 16. The mandrel 10 has an outer surface 18 on which three strips 20, 22 and 24 are being wound in a covnentional fashion to form a tube 26, the strips being conformed to the periphery of the mandrel by means of a winding belt 28 wrapped about the strips and mandrel and driven by a driving wheel 30. The driving wheel 30 is driven for rotation about its suitably journalled shaft 32 by a toothed wheel 34 in mesh with a worm 36 mounted on a driving shaft 38. The belt 28 is also trained about an idler wheel 40 rotatable about its suitably journalled shaft 42.

The shaft 38 carries a sprocket 44 driving a chain 46, which drives a sprocket 48 of a speed change mechanism 50 of conventional construction. The speed change mechanism has an output sprocket 52 driving a chain 54 which in turn drives a sprocket 56 secured to a hollow shaft or conduit 58 supported in journals 60 and 62.

Upon reference to FIG. 2 it will be observed that the hollow shaft or conduit 58 is provided with a shoulder 64 which abuts against the end 66 of the mandrel 10, a reduced portion 68 of the conduit extending through the mandrel. The conduit 58 includes a portion 70 of reduced diameter extending through the end of the enlarged portion 12 and through the portion 72 of the mandrel having the winding surface 18. The right end of the conduit, as depicted in FIG. 2, has a threaded portion 74 extending beyond the winding surface of the mandrel to receive an internally threaded nozzle member 76, closed at its right end except for the provision of a desired number of discharge ports 78 through which the plastic material to be extruded can flow under pressure. Such plastic material is introduced into the threaded end 80 of the conduit by means of a rotary joint 82 of conventional construction having a rotatable element 84 threaded into the conduit and a relatively fixed member 86 connected by means of a tube 88 with a suitable source of plastic material to be extruded under pressure.

Whereas the nozzle has been depicted in FIGS. 3 and 4 as having four discharge ports, any desired number of such ports can be employed, depending upon the number of beads desired on the internal wall of the tube.

It will be understood by those skilled in the art that the pitch and depth of the rib or bead are variable so as to adapt the tube to cooperation with a wide variety of threaded cores. Moreover, by varying the composition of the extruded material, the resilience, flexibility, hardness and other characteristics of the bead will be capable of wide variation.

The tube or coil form 26 depicted in FIG. 5 is of three-ply construction, the edges of adjacent convolutions abutting to define helical joints 90. The joints 90 of successive plies are preferably staggered in accordance with a practice which is common in the production of such tubes. The beads or stripes 92 formed on the internal wall of the tube shown in FIG. 5 are parallel to one another and to the axis of the tube. This relationship is achieved by rotating the conduit 58 at a speed equal to the winding speed of the strips and tube 26, and this relationship of speeds is achieved by adjusting the variable speed mechanism 50 by actuation of its hand wheel 94.

A magnetic core 96 having external threads 98 and a wrench socket 100 is shown as having its threads engaging the beads 92 carried by the inner wall of the tube 26. By virtue of the deformability and resilience of the composition defining the bead or beads, when the core is introduced into the tube and turned by means of a wrench, its threads 48 will form complementary threads in the bead or beads whose innermost portions lie in a cylinder of smaller diameter than a cylinder circumscribing the threads 98. Accordingly, a binding action between the core and bead material will result, preventing any accidental movement of the core relative to the tube, and maintaining any preset position of the core.

The coil form depicted in FIG. 6 differs from that of FIG. 5 in that the bead or beads 102 are helical, of the same hand as the joint 90 but of different pitch.

The coil form of FIG. 7 differs from that of FIGS. 5 and 6 in that the bead or beads 104 are helical and of opposite pitch to the joints 90. These variations are readily achieved by adjusting the hand wheel 94 of the variable speed mechanism 50.

Whereas a wide variety of materials can be used, depending upon the desired characteristics of the products to be manufactured, in conjunction with coil forms, it has been found to be desirable to employ a strip material for winding the tube produced from a polyester resin. However, a wide variety of materials can be employed, preferably impervious to moisture and fungus growth and having electrical insulating properties. Various materials can be employed to form the bead of such coil forms, but here again, polyester resins are preferred, of the types exemplified by E. I. du Pont de Nemours & Company, Polyester Adhesive Series 4695, 4696, and 4697. Polyester adhesives of these same types can be used in bonding the strips themselves together, but it is preferable that different series be used for these two purposes so that when the bead is deposited, its solvent will not adversely affect the bond holding the convolutions together. In lieu of the preferred polyester adhesives, it is intended by the present invention that rubber, silicones, epoxy resins, urethanes, and other compositions be employed which can be catalyzed and/or set by means of heat to produce a rib or bead characterized by resilience, hardness, flexibility, tackiness, and above all, extrudability to a controlled degree.

The characteristics of the polyester adhesives employed can be controlled by the addition of a thickener such as "Cab-O-Sil," a sub-microscopic pyrogenic silica, available from Cabot Corporation, 125 High Street, Boston 10, Mass. A catalyst can also be incorporated in the polyester adhesives contemplated, such as a blocked isocyanate curing agent. Various other catalysts are contemplated which will produce the desired effects with the particular compositions undergoing extrusion.

The subsequent impregnation of the internally beaded tube can be effected with a polyester resin in combination with an oxidizing catalyst such as tertiary butyl perbenzoate.

It will be understood that a suitable thickener incorporated in the composition to be extruded renders it extrudable and self-supporting and a suitable catalyst imparts cold setting properties. The subsequent impregnation renders the bead containing tube stronger to support a coil winding, improves its moisture resistance and also enhances its dielectric properties.

By varying the dimensions of the bead or beads by means of the substitution of mandrels having different orifices or ports 78, any desired torque and push-through values can be provided for a given magnetic core.

FIGS. 8 and 9 illustrate a modification of the invention that may be substituted for the structure shown in FIG. 2 and which eliminates the separate tubular nozzle, produces a larger cross section for flow of material and permits the use of lower pressures to feed material through the mandrel.

Referring to FIG. 8, clamping bracket 106, secured to frame 108, supports stationary mandrel holder 110 having a bore 112. Winding mandrel 114 is threadedly received within one end of bore 112. A nozzle operator rod 116 having a nozzle 118 provided with slots 120 extends through bore 122 formed in mandrel 114. It will be appreciated that the outer end of mandrel bore 122 is formed with a seat for the reception of the end of nozzle 118 containing slots 120. The other end of operator rod 116 is adjustably secured by means of a set screw 122 within bore 124 formed in rotary element 126 supported for rotation relative to the frame by bearings 128 and within one end of mandrel holder bore 112 by packing 130.

Although a single slot 120 is illustrated in the drawings, it is apparent that any desired number of slots may be provided depending upon the number of beads desired on the internal wall of the tube.

The operation of the apparatus depicted in FIGS. 8 and 9 is similar to that previously described although the length of the plastic material flow path is materially decreased by the introduction of this material through fitting 132 immediately adjacent the winding mandrel from whence the material flows through a portion of mandrel holder bore 112 and mandrel bore 122 to exit through slots 120.

An additional advantage of the structure shown in FIGS. 8 and 9 is that the removal, replacement and cleaning of the nozzle is greatly facilitated.

We claim:

1. A method of making a coil form comprising helically winding a plurality of flexible insulating strips in superimposed relationship on a hollow mandrel, adhesively bonding convolutions of said strips together to produce a self-supporting tube, advancing said tube along said mandrel, and extruding through at least one nozzle rotating relative to said mandrel a resilient adhesive plastic composition under pressure through said mandrel in the form of at least one bead adhering to the inner wall of said tube as said tube advances with respect to said mandrel.

2. A method according to claim 1 wherein said nozzle is rotated in the same direction as the winding direction of said strips.

3. A method according to claim 1 wherein said nozzle is rotated in a direction opposite to the winding direction of said strips.

4. A method according to claim 1 wherein each strip is composed of a polyester.

5. A method according to claim 1 wherein said plastic composition is a polyester.

6. A method according to claim 1 wherein said tube is subsequently impregnated with a polyester.

7. A method according to claim 1 wherein said nozzle and tube are rotated at equal rates relative to said mandrel.

8. A method according to claim 7, wherein a plurality of discharge ports in said nozzle are employed and a plurality of beads are adhered to the inner walls of the tube.

9. A method according to claim 7, further comprising maintaining said mandrel stationary during extrusion of the plastic composition through each nozzle.

References Cited

UNITED STATES PATENTS

| | | | |
|---|---|---|---|
| 3,367,816 | 2/1968 | Mills et al. | 156—195 XR |
| 3,376,180 | 4/1968 | Larson et al. | 156—195 |
| 3,229,012 | 1/1966 | Garner | 156—244 XR |
| 2,838,738 | 6/1958 | Antaler et al. | 336—136 |
| 3,105,948 | 10/1963 | McFarlane | 336—136 |

PHILIP DIER, *Primary Examiner.*

U.S. Cl. X.R.

93—80; 156—195, 244, 425, 500; 264—173; 336—136